United States Patent [19]
Sloop et al.

[11] Patent Number: 5,375,973
[45] Date of Patent: Dec. 27, 1994

[54] TURBINE BLADE OUTER AIR SEAL WITH OPTIMIZED COOLING

[75] Inventors: Robert V. Sloop, Jupiter; George W. Kelch, Palm Beach Gardens; Thomas A. Auxier, Palm Beach Gardens; Gregory J. Mack, Palm Beach Gardens, all of Fla.

[73] Assignee: United Technologies Corporation, Hartford, Conn.

[21] Appl. No.: 993,862

[22] Filed: Dec. 23, 1992

[51] Int. Cl.⁵ .................................................. F01D 5/20
[52] U.S. Cl. ........................... 415/173.1; 415/115
[58] Field of Search .............. 415/173.1, 173.4, 115, 415/116, 139

[56] References Cited

U.S. PATENT DOCUMENTS

| | | | |
|---|---|---|---|
| 4,013,376 | 3/1977 | Bisson et al. | 415/139 |
| 5,205,115 | 4/1993 | Plemmons | 415/173.1 |
| 5,219,268 | 6/1993 | Johnson | 415/115 |

Primary Examiner—Edward K. Look
Assistant Examiner—Mark Sgantzos

[57] ABSTRACT

This disclosure describes a cooling and manufacturing enhancement for gas turbine engine outer air seals. The invention provides convective cooling in a counter-flow array, internal heat transfer augmentation through the use of boundary layer trip-strips, coolant Mach number control through the use of tapered convective channels, inter-segment purge without additional secondary cooling air, and is castable.

11 Claims, 5 Drawing Sheets

5,375,973

TURBINE BLADE OUTER AIR SEAL WITH OPTIMIZED COOLING

DESCRIPTION

1. Field of the Invention

This invention relates to gas turbine engines of the type having an annular flow path for working fluid. The invention is particularly related to a seal formed from several seal segments that extend circumferentially about the engine's longitudinal axis, and confine the working fluid to the flow path.

2. Background Art

An axial flow, gas turbine engine has a compression section, a combustion section and a turbine section. An annular flow path for the working fluid extends axially through the sections. A stator assembly extends about the annular flow path for confining the working fluid to the flow path and for directing the fluid along the flow path.

As the working fluid flows along the flow path, the working fluid is pressurized in the compression section and burned with fuel in the combustion section to add energy to the working fluid. The hot, pressurized working fluid is expanded through the turbine section to produce work. A major portion of this work is used for driving a free turbine or developing thrust for an aircraft.

A remaining portion of the work generated by the turbine section is not used for these purposes, Instead it is used to compress the working fluid itself. A rotor assembly extends between the turbine section and the compression section to transfer this work from the turbine section to the compression section. The rotor assembly in the turbine section has rotor blades which extend outwardly across the working medium flow path. The rotor blades have airfoils which are angled with respect to the approaching flow to receive work from the working fluid and to drive the rotor assembly about the axis of rotation.

An outer air seal circumscribes the rotor blades to confine the working fluid to the flow path. The outer air seal is part of the stator structure and is formed of a plurality of arcuate segments. The stator assembly further includes an outer case and a structure for supporting the segments of the outer air seal from the outer case. The outer case and the support structure position the seal segments in close proximity to the blades to block the leakage of the working fluid past the tips of the blades. As a result, the segments are in intimate contact with the hot working fluid, receive heat from the working fluid and are cooled to keep the temperature of the segments within acceptable limits.

The use of cooling air increases the service life of the outer air seal in comparison to uncooled outer air seals. However, the use of cooling air decreases the operating efficiency of the engine because a portion of the engine's useful work is used to pressurize the cooling air in the compressor. A decrease in the amount of cooling air required to provide a satisfactory service life for components such as the outer air seal increases the work available for other purposes, such as providing thrust or powering a free turbine, and increases the overall engine efficiency.

Accordingly, what is needed is an outer air seal that minimizes the need for cooling air while providing the cooling necessary to extend the useful life of the outer air seal.

DISCLOSURE OF THE INVENTION

It is therefore an object of the present invention to provide an outer air seal that minimizes the need for cooling air while providing the cooling necessary to extend the useful life of the outer air seal.

Accordingly, this invention provides a cooling and manufacturing enhancement for a gas turbine engine outer air seal. The seal is made up of a plurality of seal segments which provide convective cooling in a counter-flow army, internal heat transfer augmentation through the use of boundary layer trip strips, coolant Mach number control through the use of tapered convective channels, inter-segment purge without additional secondary cooling air, and are castable. The counter-flow design increases thermal effectiveness, reduces circumferential temperature gradients, and locates hot spots away from the inter-segment gaps. The use of spent coolant to cool and purge the inter-segment gaps eliminates the requirement for dedicated secondary cooling air, increasing turbine efficiency.

The geometry of the seal in this disclosure is variable. The seal segments may be coated with thermal barrier and/or abradable coatings. The thermal barrier coating could be applied to portions of the seal segment to insulate the metal and reduce cooling air requirements to these portions. The abradable coating could be applied to the seal segment in the blade rub zone to maintain close clearances, improving the turbine efficiency. For extremely high temperature applications, the convective cooling within the seal segments can be augmented with film cooling from the internal cooling air flow passages therein.

The foregoing and other features and advantages of the present invention will become more apparent from the following description and accompanying drawings.

BEST MODE FOR CARRYING OUT THE INVENTION

Figure 1:
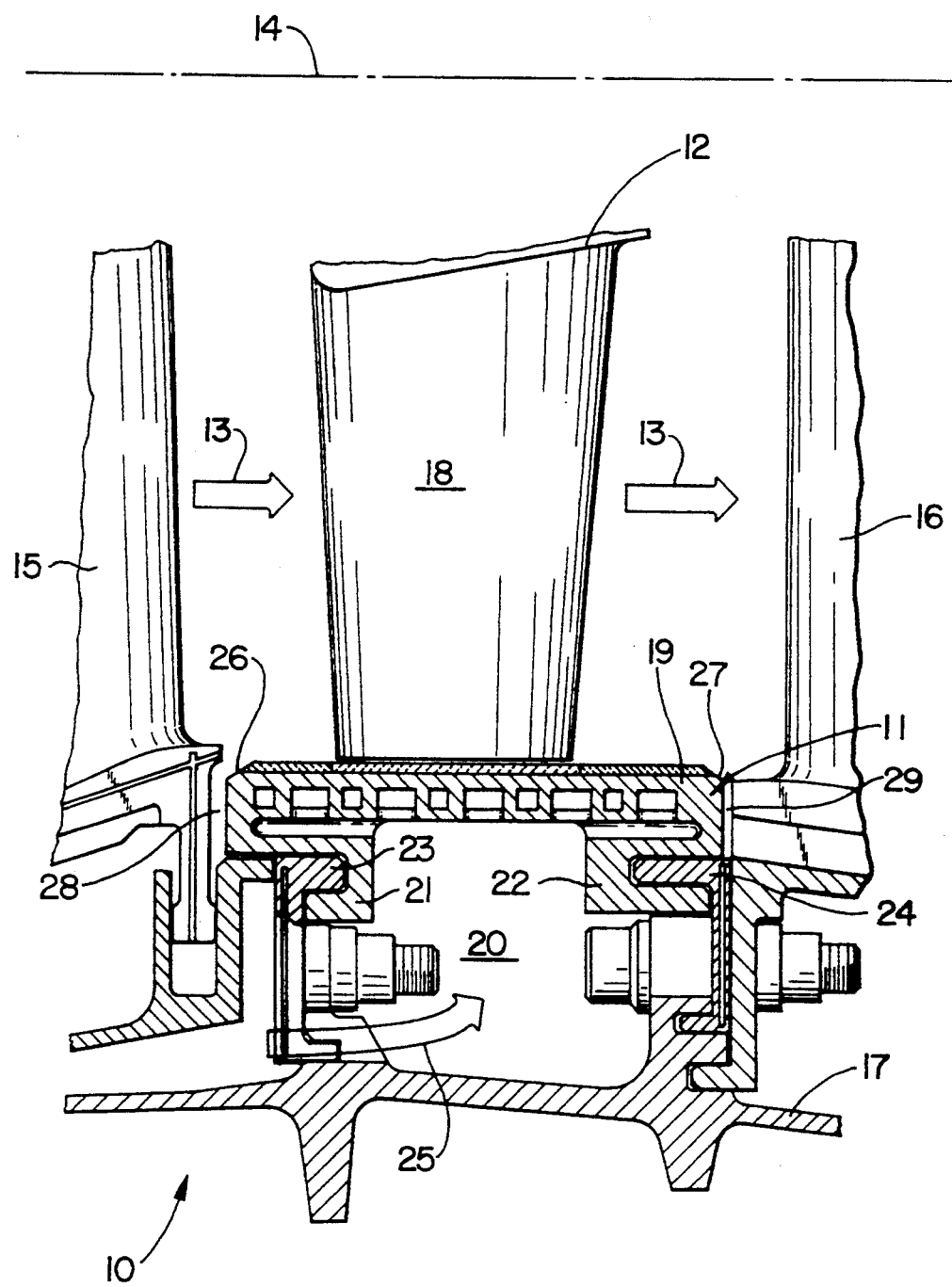
FIG. 1 is a cross-sectional view of a portion of a gas turbine engine incorporating the seal of the present invention.

FIG. 1 shows a portion of an axial flow gas turbine engine 10 having an axis of rotation 14 defined therethrough and incorporating the seal 11 of the present invention. A portion of one stage 12 of the turbine of the engine 10 is shown in FIG. 1 and includes an annular flow path 13 disposed about the axis 14 for the combustion gases that are the working fluid of the engine. The turbine stage 12 has one stator assembly 15 axially upstream of the stage 12, and another stator assembly 16 axially downstream thereof. The stators 15, 16 are part of the static structure of the engine 10, and each stator assembly 15, 16 includes an outer case 17. The outer case 17 extends circumferentially around the flow path 14 of working fluid.

The turbine stage 12 has a plurality of rotor blades, which are represented by the single rotor blade 18 in FIG. 1, that extend radially outward relative to the axis 14 across the flow path 13 into close proximity with the outer case 17. An outer air seal 11 made up of a plurality of arcuate seal segments (represented by the single seal segment 19 in FIG. 1) extends about the axis 14 to bound the annular flow path 13, and the seal 11 circumscribes the tips of the rotor blades 18. The outer air seal 11 is spaced radially inwardly from the outer case 17 leaving a circumferentially extending cavity 20 therebetween. The cavity 20 is in flow communication with a source of cooling air (not shown) and for cooling the segments 19 of the seal 11 as discussed below. Each arcuate seal segment 19 has an upstream hook 21 and a downstream hook 22 to engage upstream and downstream supports 23, 24, respectively, which extend inwardly from the outer case 17. The supports 23, 24 are attached to the outer case 17 to support and position the outer air seal 11 about the rotor blades 18. Each support 23, 24 may be segmented to reduce the hoop strength of the support 23, 24.

A first flow path 25 for cooling air extends inwardly of the outer case 17. The cooling air flow path is bounded by the outer case 17 and extends through the engine outwardly of the flow path 13 of the working fluid. The cooling air flow path extends into the cavity 20 between the outer air seal 11 and the outer case 17.

Each seal segment 19 of the outer air seal 11 has a leading edge 26 and a trailing edge 27. The leading edge 26 is in spaced relation to the adjacent stator assembly 15 leaving a circumferentially extending cavity 28 therebetween. The cavity 28 forms a second cooling air flow path which extends axially and circumferentially beneath the leading edge region. The trailing edge 27 is in spaced relation to adjacent stator assembly 16 leaving an annular cavity 29 therebetween which forms a third cooling air flow path.

Figure 2:
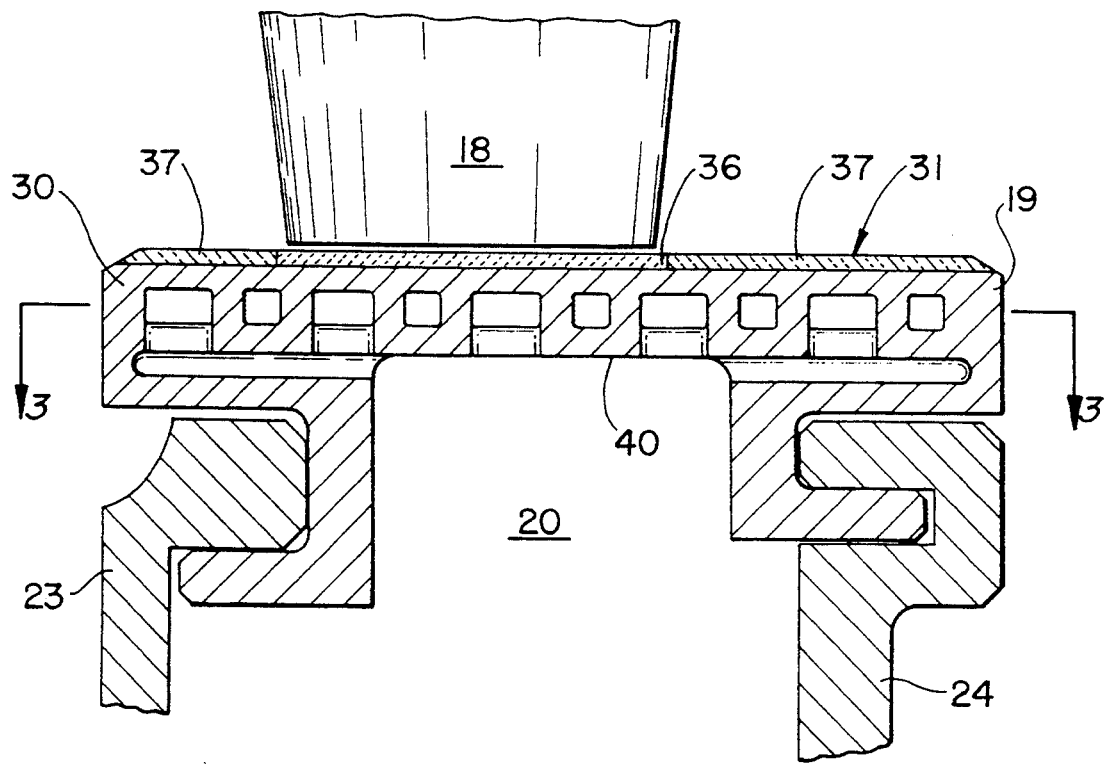
FIG. 2 is an isolated view of certain components of the view of FIG. 1.
Figure 3:
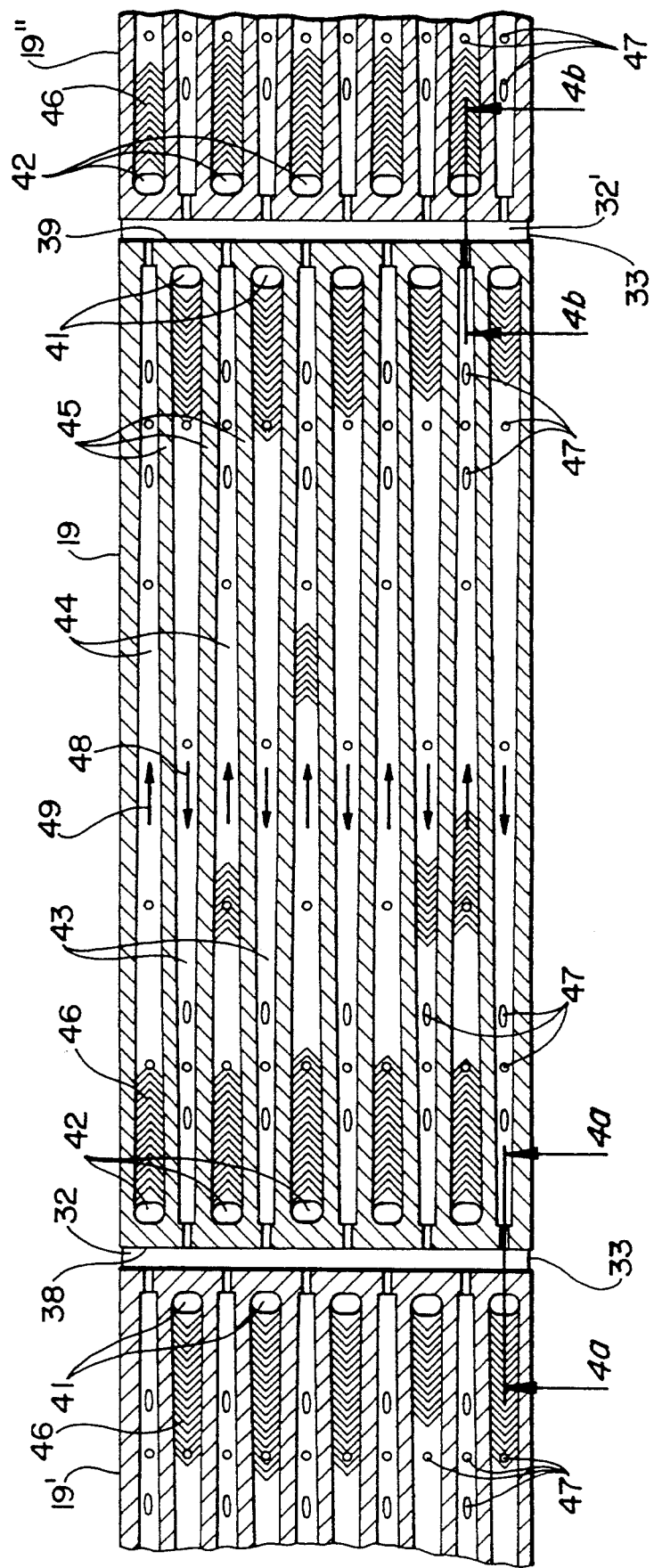
FIG. 3 is a cross-sectional view taken along line 3—3 of FIG. 2.

FIG. 2 shows a view, in isolation, of the outer air seal segment 19, supports 23, 24, and rotor blade 18 of FIG. 1, and FIG. 3 shows a cross-sectional view of two adjacent arcuate seal segments 19 taken along the line 3—3 of FIG. 2. Each seal segment 19 has a metallic base 30 that has an arcuate sealing surface 31 that extends circumferentially about the axis 14. The adjacent seal segments 19', 19" are spaced circumferentially from each other leaving an inter-segment gap 32, 32' therebetween as shown in FIG. 3. The inter-segment gap 32, 32' varies in size under operative conditions of the engine 10. An inter-segment seal 33 extends axially between the segments 19, 19', 19" and laterally across the width of the inter-segment gap 32, as shown in FIG. 4. The inter-segment seal 33 is slidably received in grooves 34, 35 in the adjacent segments 19, 19', 19".

As those skilled in the art will readily appreciate, due to the extremely high temperature of the working fluid, the segments 19 of the outer air seal 11 absorb heat from the working fluid. Since the metallic base 30 is made of a material that would have relatively low creep strength at the temperature of the working fluid, each of the segments 19 must be cooled to maintain the temperature of the metallic base 30 well below the temperature of the working fluid.

Referring again to FIG. 2, the sealing surface 31 of each segment faces the turbine blades 18 and the working medium flow path 13. A portion of the sealing surface 31 of each segment 19 preferably includes a coating of an abradable material 36, and another portion of the sealing surface 31 preferably includes a coating of a thermal barrier material 37, as shown in FIG. 2. Such abradable and thermal barrier materials are well known in the art, and therefore are not detailed further in this disclosure. A first surface 38 of each segment 19 adjacent to the sealing surface 31 thereof extends axially along the each segment 19 relative to the axis 14. A second surface 39 of each segment 19 opposite the first surface 38 and adjacent to the sealing surface 31 also extends axially along the same segment 19. Opposite the sealing surface 31 is a coolant supply surface 40 that is parallel to, but offset from, the sealing surface 31. The coolant supply surface 40 extends between the first and second surfaces 38, 39, and the coolant supply surface 40 has a plurality of cooling orifices extending therethrough. A first group of the cooling orifices 41 are located adjacent the second surface 39, and a second group of cooling orifices 42 extend through the coolant supply surface 40 adjacent the first surface 38, as shown in FIG. 3. These orifices 41, 42 are sized to meter the flow of cooling air therethrough based on the supply pressure of the cooling air and the desired heat transfer from the seal segments 19. In the embodiment shown in FIG. 3, all of the orifices 41, 42 have the same flow area.

Each segment 19 has a plurality of cooling passages located between the sealing surface 31 and the coolant supply surface 40, as shown in FIG. 3. A first group of the cooling passages 43 extend from the from the first surface 38 toward the second surface 39, and each of these cooling passages 43 intersects the first surface 38 and terminates short of said second surface 39. Each of the first group of cooling passages 43 communicates with the supply of cooling air in the cavity 20 of the static structure through one of the first group of cooling orifices 41. A second group of the cooling passages 44 extends from the second surface 39 toward the first surface 38, and each of these cooling passages intersects the second surface 39 and terminates short of the first surface 38. Each of the second group of cooling passages 44 communicates with the supply of cooling air through the cavity 20 in the static structure through one of one of the second group of cooling orifices 42. As shown in FIG. 3, each of the cooling passages 43, 44 within each segment 19 is separated from adjacent cooling passages by a wall 45 that runs the length of the passage.

As shown in FIG. 3, the cooling passages within a given segment alternate between first group 43 and second group 44 cooling passages, such that most of the first group of cooling passages 43 are interposed with most of the cooling passages of the second group 44. In the preferred embodiment, only the cooling passages immediately adjacent the leading and trailing edges 26, 27 of the segment 19 are not interposed with cooling passages of the other group. The inner surface of each of the cooling passages has trip-strips 46 along the length thereof to enhance heat transfer between the cooling air and the seal segment 19. As those skilled in the art will readily appreciate, the use of trip-strips in the coolant boundary layer creates regenerative turbulence, increasing heat transfer coefficient and the absorption of heat from the segment 19 by the cooling air.

If the cooling passages 43, 44 of the present invention had constant flow area along the length thereof, as the cooling air flowed through one of the passages the cooling air would heat up and the Mach number of the cooling air would decrease. This decrease in Mach number would result in a decreasing coefficient of heat transfer along the length of each passage. To prevent that from occurring, the present invention incorporates tapered cooling passages 43, 44 that increase the cooling air Mach number as the cooling air heats up, thereby maintaining high heat transfer coefficients and high heat transfer rates along the length of each cooling passage. Accordingly, for each segment 19, each of the cooling passages of the first group 43 tapers from a first flow area immediately adjacent one of the first cooling orifices 41 to a second flow area adjacent the first surface 38, and each of the cooling passages of the second group 44 tapers from the first flow area immediately adjacent one of the second cooling orifices 42 to the second flow area adjacent the second surface 39. The taper is designed to increase Mach number of the cooling air as the cooling air flows through the cooling passages and absorbs heat.

This invention is not intended to be limited to cooling passages having a flow area taper of a specific ratio, since, as those skilled in the art will readily appreciate, the actual flow area of each passage at a particular position along the length thereof depends on the rate and pressure at which cooling air is supplied to the cooling passages, the rate of heat transfer from the working fluid through the segment at engine operating conditions, and the desired heat transfer from each segment. The thermal environment, cooling air flow goals, and manufacturing restrictions dictate the number of passages. The geometry and number of trip-strips, and degree of passage taper for Mach number recovery are dictated by the particular gas turbine engine application.

Each of the cooling passages 43, 44 of each segment 19 preferably includes one or more resupply orifices 47 along the length thereof. Thus each of the cooling passages of the first group 43 has at least one resupply orifice 47 between the cooling orifice 41 in communication therewith and the first surface 38, and each of the cooling passages of the second group 44 includes at least one resupply orifice 47 between the second cooling orifice 42 in communication therewith and the second surface 39. Each of the cooling passages 43, 44 communicates with the supply of cooling air in the cavity 20 through the resupply orifice 47 located therein. The cooling air is thus resupplied or reinforced in each passage 43, 44 at one or more locations in order to regenerate passage flow and provide adequate cooling air outflow for cooling the first and second surfaces 38, 39 of each segment 19 and providing adequate purge of the inter-segment gap 32.

In view of the foregoing discussion, it should now be apparent that, within a particular segment 19, the cooling air from the supply in the cavity 20 flows through the first group of cooling passages 43 in one direction 48 and exits into the inter-segment gap 32 at the first surface thereof 38, and cooling air from the supply flows through the second group of cooling passages 44 in the opposite direction 49 and exits at the second surface 39 into the inter-segment gap 32' (not shown) adjacent the second surface 39 thereof. Each segment 19 is thus cooled by counter-flowing cooling air flowing within the cooling passages 43, 44.

Figure 4A:
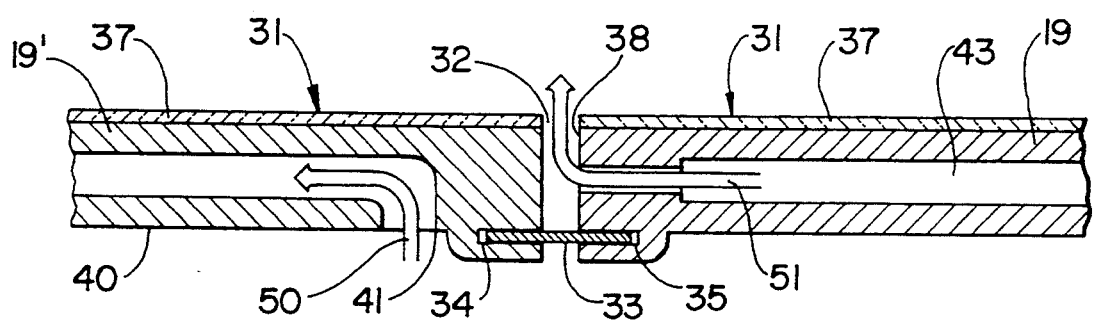
FIG. 4 is a cross-sectional view taken along line 4—4 of FIG. 3.
Figure 4B:
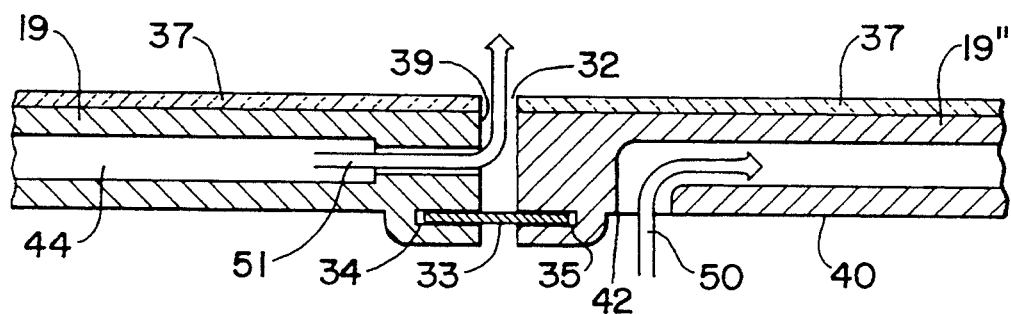

The cooling air flow that cools and purges the inter-segment gaps 32, 32' are shown in FIGS. 4a and 4b, which show a cross-sectional view taken along lines 4a—4a and 4b—4b of FIG. 3. FIGS. 4a and 4b show the inter-segment seal 33 between seal segment 19 and the two adjacent seal segment 19', 19'', the flow path 50 of cooling air flowing into a cooling passage through one of the cooling orifices 41, and the flow path 51 of cooling air exiting one of the cooling passages and purging the inter-segment gap 32. The inter-segment seal 33 prevents the spent cooling air from flowing radially outward within the inter-segment gap 32, thereby directing the spent cooling air into the annular flow path 13 of the working fluid of the engine 10.

Figure 6:
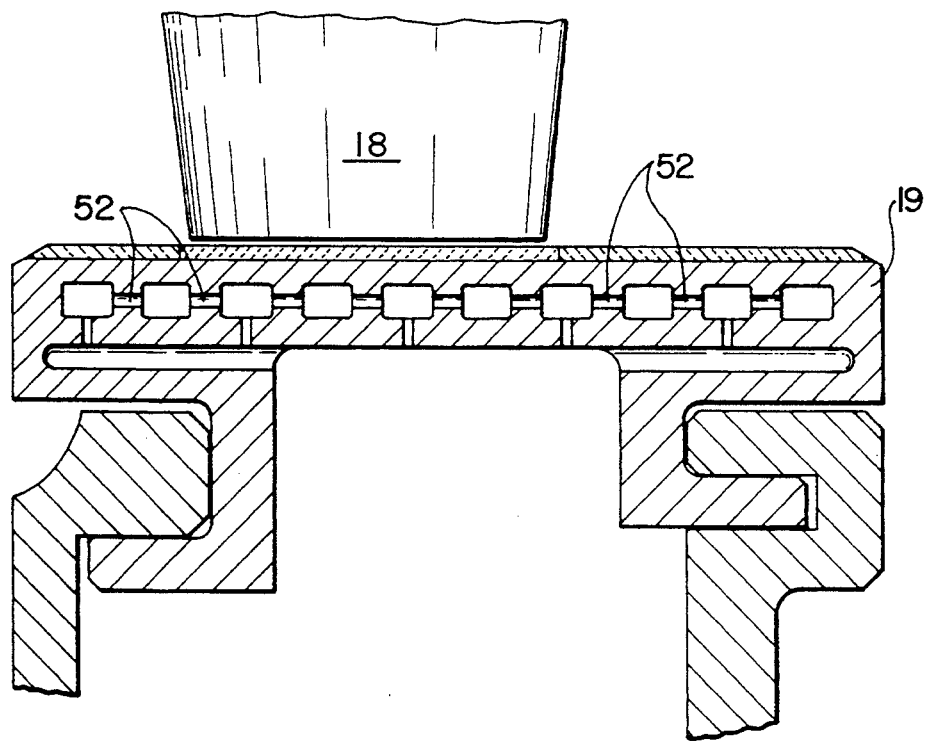
FIG. 6 is a cross-sectional view taken along line 6—6 of FIG. 5.
Figure 5:
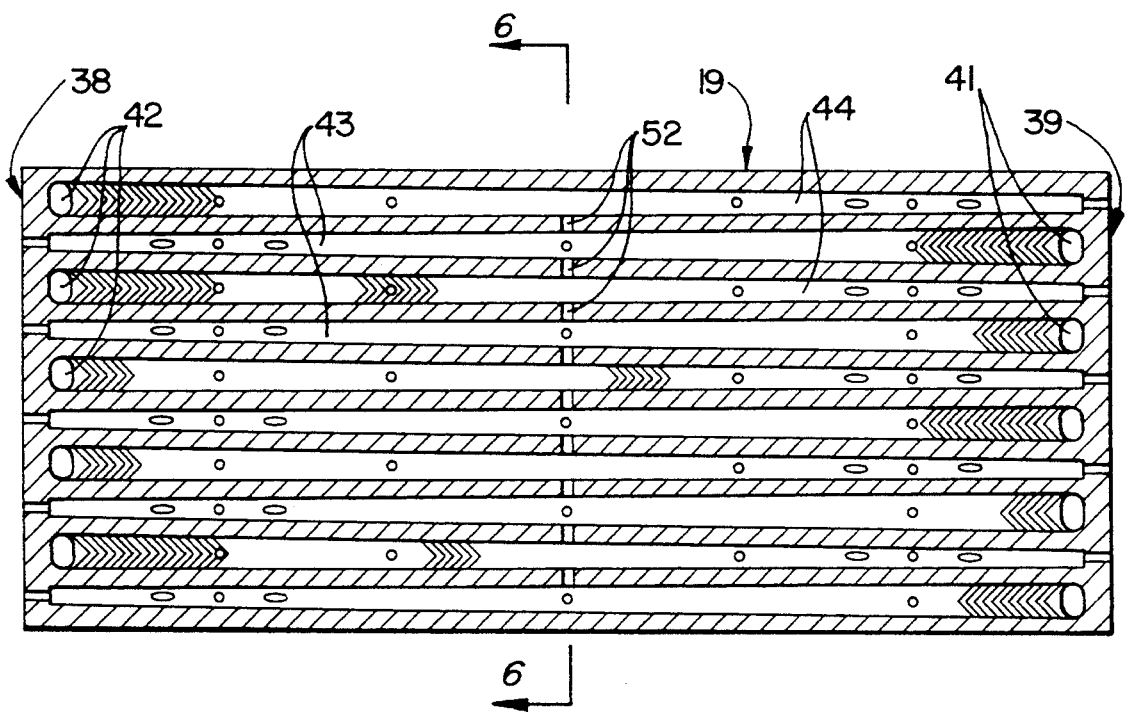
FIG. 5 is a view of another embodiment of the present invention similar to the view of FIG. 3.

FIGS. 5-8 show additional features that may be incorporated into the seal segments 19 of the present invention depending on the specific environment in which the seal 11 is to be used. FIG. 5 shows a view similar to the view of FIG. 3, but showing only one seal segment 19. FIG. 6 is a cross-sectional view taken along the midspan of the seal segment 19, corresponding to line 6—6 of FIG. 5. As shown in FIGS. 5 and 6, each of the walls 45 has a cross-supply orifice 52, and each cooling passage 43, 44 communicates with immediately adjacent cooling passages through one of these cross-supply orifices 52. The cross-supply holes provide for the crossflow of cooling air between the cooling passages 43, 44 in the event that the flow within a particular passage should decrease, as in the case where the metering orifice of a cooling passage is partially obstructed by a foreign object that migrated from the cooling air supply and through the cavity 20 to the seal segment 19.

Figure 7:
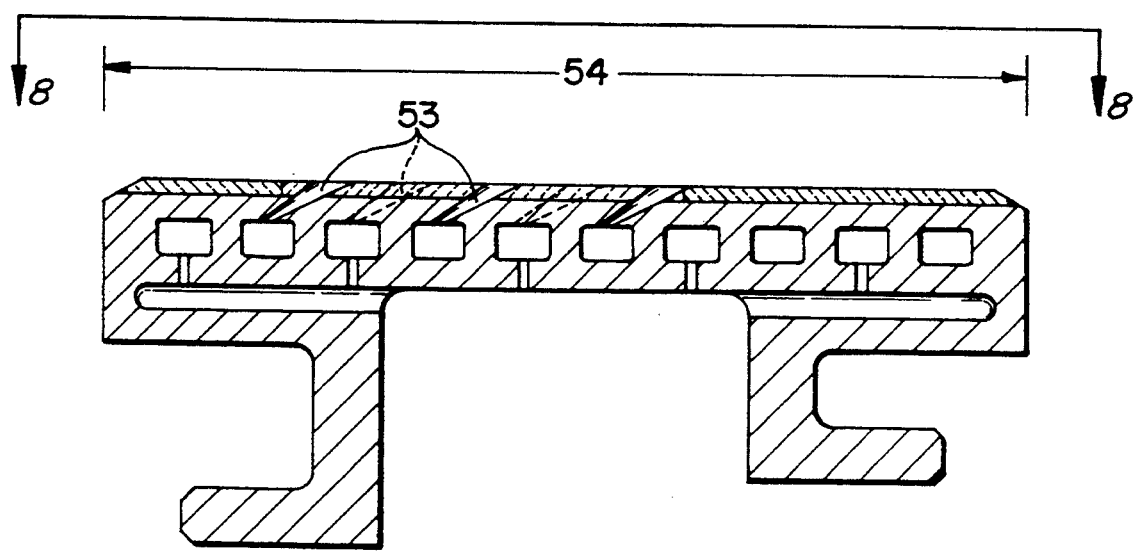
FIG. 7 is a view of a third embodiment of the present invention.
Figure 8:
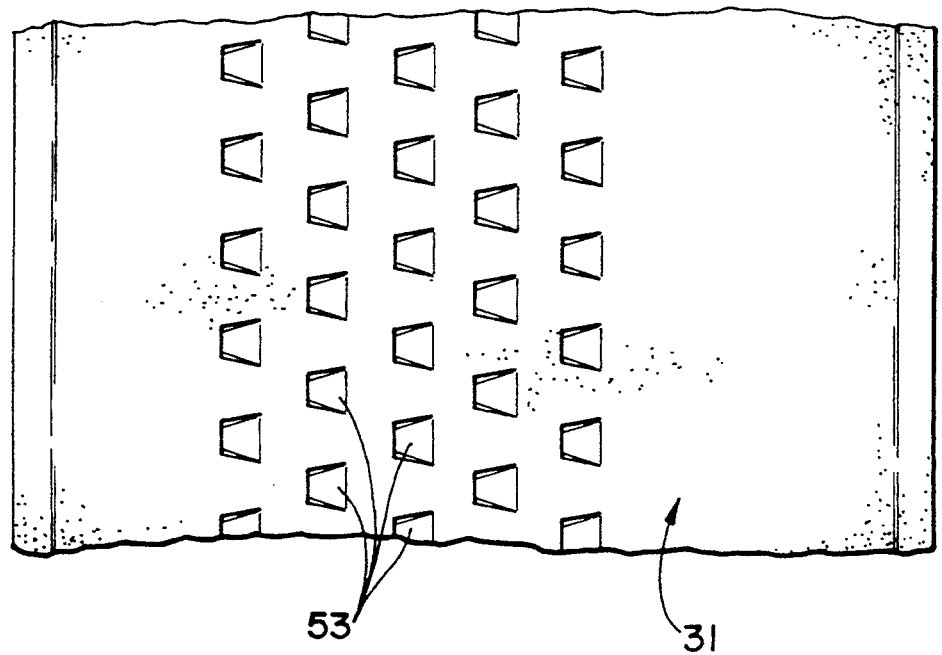
FIG. 8 is a plan view of the third embodiment of the present invention taken along line 8—8 of FIG. 7.

FIGS. 7 and 8 show the seal segment 19 of the present invention incorporating a plurality of film cooling holes 53 in the portion 36 of the sealing surface 31 of each segment 19 that is coated with an abradable material. Some of the cooling passages communicate with the sealing surface 31 through these film cooling holes 53, so that some of the cooling air flowing through these cooling passages flows into contact with sealing surface 31 through the film cooling holes 53, thereby protecting the sealing surface 31 from direct contact with the high temperature working fluid.

In operation, cooling air flows into the tapered cooling passages 43, 44 of the present invention through the metering orifices 41, 42 located at each end 38, 39 of the seal segment 19. The cooling air then flows over the trip-strips 46, which create turbulence in the boundary layer and increase the internal heat transfer coefficient of the cooling air. As the cooling air flows through the cooling passages 43, 44 and heats up, the taper thereof increases the Mach number, thereby maintaining high heat transfer coefficients. The spent cooling air is then dumped into one of the inter-segment gaps 32 to provide cooling and purge thereof. The size of the metering orifices can be varied for individual cooling passage flow control, adding the capability to match the cooling potential to heat flux by increasing the cooling air flow to the "hot spots" along the axial chord 54 of each segment 19, and decreasing the coolant flow to "cool spots", thereby reducing the over-all cooling air flow requirement. The counter-flow design of the seal segment 19 increases thermal effectiveness, reduces circumferential temperature gradients, and locates the hot spots away from the inter-segment gap 32.

The seal segment 19 of the present invention can be fabricated by providing a shell and core having the desired dimensions of the seal segment 19 as described above, including a shell having a mold pattern of a sealing surface, a mold pattern of a first surface adjacent to the mold pattern of the sealing surface and extending along the shell, a mold pattern of a second surface adjacent to the mold pattern of the sealing surface and extending along the shell parallel to the mold pattern of the first surface, a mold pattern of two supports, each mold pattern extending from one of the mold patterns for the first or second surface, and a mold pattern of a third surface opposite the mold pattern of the sealing surface and extending between the mold pattern of the two supports.

The core for the shell must have mold patterns for a plurality of first cooling passages extending from a first end of the core and terminating short of a second end of the core opposite the first end thereof, the mold pattern for each of the first cooling passages having a mold pattern for a first cooling orifice adjacent the first end of the core, mold patterns for a plurality of second cooling passages extending from the second end of the core and terminating short of the first end thereof, and the mold pattern for each of the second cooling passages having a mold pattern for a second cooling orifice adjacent the second end of the core. The core may additionally have the mold patterns for each of the cooling passages connected at the midspan of the core by a mold pattern for a plurality of cross-supply holes, and each of the mold patterns for the cooling passages may also have a mold pattern for a resupply orifice, and each of the mold patterns for the cooling passages may have a mold pattern for a film cooling hole.

The core is then placed into the shell such that the mold patterns for the cooling orifices bear upon the mold pattern of the third surface of the shell, and the mold patterns of the first cooling passages bear upon the mold patterns of the first surface, and the mold patterns of the second cooling passages bear upon the mold patterns of the second surface. If the mold patterns for the resupply orifices were included in the mold patterns for the cooling passages, the mold patterns for the resupply orifices will bear upon the mold pattern for the third surface during the step of placing the core into the shell. Likewise, if the mold patterns for the film cooling holes were included in the mold patterns for the cooling passages, the mold patterns for the film cooling holes will bear upon the mold pattern for the sealing surface during the step of placing the core into the shell.

Molten material is then introduced into the shell, the material is solidified by cooling, the shell is removed from the solidified material, and the core is then leached from within the solidified material. The cross-supply holes aid in casting of the segment by providing lateral support between the passage pieces of the casting core at the midsection of the core. The casting core is also supported at the ends of each passage and at the cooling air resupply orifice locations. The multiple core support locations also ease core leachability by providing intermediate penetration locations.

Although this invention has been shown and described with respect to a detailed embodiment thereof, it will be understood by those skilled in the art that various changes in form and detail thereof may be made without departing from the spirit and scope of the claimed invention.

I claim:

1. A seal for an axial flow gas turbine engine having an axis of rotation defined therethrough, an annular flow path concentric with said axis for working fluid flowing through at least one turbine stage of said engine, said one turbine stage including a plurality of turbine blades extending radially outward from said axis, and said flow path bounded by a static structure, and an annular seal secured to said static structure radially outward of said one turbine stage, said seal absorbing heat from said working fluid, said seal comprising:

a plurality of arcuate seal segments extending circumferentially about the flow path, each segment spaced radially outward from said turbine blades, each segment spaced circumferentially from each adjacent segment defining an inter-segment gap therebetween, each seal segment including a sealing surface facing the working medium flow path, a first surface adjacent to the sealing surface and extending axially along the segment, a second surface adjacent to the sealing surface and extending axially along the segment, a coolant supply surface opposite the sealing surface and extending between said first and second surfaces, said coolant supply surface having a plurality of first cooling orifices extending therethrough adjacent said second surface, and said coolant supply surface having a plurality of second cooling orifices extending therethrough adjacent said first surface, a plurality of first cooling passages extending from the first surface toward the second surface, said first cooling passages located between said sealing surface and said coolant supply surface, each of said first cooling passages intersecting the first surface and terminating short of said second surface, and each of said first cooling passages communicating with a supply of cooling air in the static structure through one of the first cooling orifices, a plurality of second cooling passages extending from the second surface toward the first surface, said second cooling passages located between said sealing surface and said coolant supply surface, each of said second cooling passages intersecting the second surface and terminating short of said first surface, and each of said second cooling passages communicating with said supply of cooling air through one of said second cooling orifices, each of said cooling passages of one of the segments is separated from adjacent cooling passages of said segment by a wall therebetween, wherein cooling air from said supply flows through said first passages in a first direction and exits said first cooling passages into one of said inter-segment gaps at said first surface, and cooling air from said supply flows through said second passages in a second direction counter to said first direction and exits said second cooling passages at said second surface into another of said inter-segment gaps.

2. The seal of claim 1 wherein most of the first cooling passages of each segment are interposed with most of the second cooling passages of said segment.

3. The seal of claim 2 wherein each of the first cooling passages tapers from a first flow area immediately adjacent one of the first cooling orifices to a second flow area adjacent the first surface, and each of the second cooling passages tapers from said first flow area immediately adjacent one of the second cooling orifices to said second flow area adjacent the second surface, said taper designed to increase Mach number of the cooling air as the cooling air flows through the cooling passages and absorbs heat.

4. The seal of claim 3 wherein each of the cooling passages has trip-strips along the length thereof to enhance absorption of heat by the cooling air.

5. The seal of claim 4 wherein each of the first cooling passages includes at least one resupply orifice between the first cooling orifice in communication therewith and said first surface, and each of the second cooling passages includes at least one resupply orifice between the second cooling orifice in communication therewith and said second surface, and each of said passages communicates with the supply of cooling air through the resupply orifice therein.

6. The seal of claim 5 wherein a first portion of the sealing surface of each segment includes a coating of an abradable material.

7. The seal of claim 6 wherein a second portion of the sealing surface of each segment includes a thermal barrier material.

8. The seal of claim 7 wherein each of the walls has a cross-supply orifice, and each cooling passage communicates with immediately adjacent cooling passages through one of said cross-supply orifices.

9. The seal of claim 6 wherein the portion of the sealing surface of each segment that includes an abradable material has a plurality of film cooling holes therein, and some of said cooling passages communicate with the sealing surface through said film cooling holes so that some of the cooling air flowing through said some of said cooling passages flows into contact with said sealing surface through said film cooling holes and provides film cooling of the segment thereby protecting the sealing surface from direct contact with the working fluid.

10. The seal of claim 9 wherein each of the walls has a cross-supply orifice, and each cooling passage communicates with immediately adjacent cooling passages through one of said cross-supply orifices.

11. The seal of claim 10 wherein a second portion of the sealing surface is coated with a thermal barrier material.

* * * * *

UNITED STATES PATENT AND TRADEMARK OFFICE
CERTIFICATE OF CORRECTION

PATENT NO. : 5,375,973
DATED : December 27, 1994
INVENTOR(S) : Sloop et al.

It is certified that error appears in the above-indentified patent and that said Letters Patent is hereby corrected as shown below:

In column 1, before "DESCRIPTION", insert --The invention was made under a U.S. Government contract and the Government has rights herein.--

In column 2, in line 13, change "army" to --array--.

Signed and Sealed this

Twentieth Day of June, 1995

Attest:

BRUCE LEHMAN

Attesting Officer       Commissioner of Patents and Trademarks